Patented Sept. 21, 1943

2,330,180

UNITED STATES PATENT OFFICE 2,330,180

MODIFYING CASTOR OIL

Alexander Schwarcman, Buffalo, N. Y., assignor to Spencer Kellogg and Sons, Inc., Buffalo, N. Y., a corporation of New York No Drawing. Application October 23, 1941, Serial No. 416,283

10 Claims. (Cl. 260—405.5)

This invention relates to modifying castor oil; and it comprises a method of modifying castor oil to render it miscible with mineral oils, or to impart drying properties to it, by dehydration, wherein a catalytic proportion of a phosphorus-chlorine compound, advantageously $POCl_3$, phosphorus oxychloride, is dissolved in the oil and the oil is heated, usually under subatmospheric pressure, for such temperature and time as to effect at least partial dehydration of the oil; the heating conditions often being such as to polymerize the oil in addition to dehydrating it; all as more fully hereinafter set forth and as claimed.

Castor oil is largely composed of ricinolein, the triglyceride of ricinoleic acid. Ricinoleic acid has one double bond in the carbon chain, and is further characterized by carrying an alcoholic hydroxyl (—OH) group. By virtue of its alcoholic nature, castor oil is soluble in alcohol, but it is not soluble in most hydrocarbon solvents, including petroleum oils. Normal castor oil is a lubricant, but it is not miscible with petroleum lubricating oils. Nor is normal castor oil a drying oil. It does not "dry" to form firms, in the manner of linseed oil and other true drying oils.

By heating castor oil under suitable conditions of temperature and pressure the oil is progressively changed in properties. After relatively little heating, castor oil becomes miscible with some mineral oils. Continued heating results in a product having drying or film-forming properties. Such treatments make the modified castor oil useful in many compositions for which the raw oil is quite unsuited.

These changes are due to reactions taking place in the oil; usually dehydration or dehydroxylation, with elimination of some or all of the alcoholic hydroxyl groups from the ricinoleic acid chains. In general an adjacent hydrogen atom is removed with each hydroxyl group, forming $H_2O$, which is evolved as steam. An additional double bond is thus established in each ricinoleic acid group. The drying properties of the processed oil depend on how many of these additional double bonds are developed in the castor oil. The extent to which double bonds have been developed (by removal of hydroxyl groups) in castor oil can be judged by means of the well-known acetyl test. Raw castor oil has an acetyl value of about 125 to 150. An ideal drying oil would have zero acetyl value. The iodine value also indicates the extent to which new double bonds are developed.

In practice, other reactions take place during the heat treatment, besides the desired dehydration. These side reactions involve esterification, darkening, development of acidity and pyrolysis (destructive distillation) to a greater or less extent, and are undesirable. Because of them, it is difficult to obtain a light colored commercial oil free of acidity and other undesirable properties. These difficulties are especially pronounced when an attempt is made to produce a substantially completely dehydroxylated, polymerized oil by heating castor oil alone.

Many suggestions have been made to incorporate various substances in castor oil to accelerate dehydration or minimize side reactions or both, during heating. Most of the catalytic substances proposed have been acids or acidic substances. This tendency of the art is probably due to the knowledge or belief that in the dehydration of castor oil by simple heat treatment, free ricinoleic is formed, and that this acid catalyzes dehydration. Accordingly, the art has generally tried to substitute some other acid for the ricinoleic acid. Unfortunately most of the acidic substances proposed have more or less accelerating effect on the side reactions as well as on dehydration. In fact, most of them discolor the oil to a marked degree. Other disadvantages are that many such catalysts especially inorganic acid compounds, are not soluble in castor oil, and special steps have to be taken to keep them distributed through the oil during treatment. It is a matter of great difficulty to distribute a fraction of a per cent of an insoluble liquid or solid, throughout a batch of oil, and at best the effective area, so to speak, of the catalyst is only a small fraction of that possible with a dissolved catalyst.

The present invention departs from the usual teachings of the art. I have discovered a class of catalysts which are quite as effective as acid catalysts in promoting dehydration, but are substantially free from any tendency to char the oil or otherwise discolor it. The catalysts employed in the present invention are, moveover, completely soluble in castor oil, in the proportions necessary for catalysis. These catalysts are the compounds of phosphorus and chlorine, of which phosphorus oxychloride ($POCl_3$) is especially advantageous. Other useful members of the group are phosphorus trichloride ($PCl_3$) and phosphorus pentachloride ($PCl_5$) which substances are neutral and stable, are soluble in castor oil and have the desired catalytic effect on dehydration.

These catalysts effectively accelerate the dehydration reaction but they do not decompose the oil. They do not darken or otherwise injure the oil, even when the oil containing them is heated to high temperatures for prolonged periods, to polymerize it. They can be dissolved in the cold oil and heated up with the oil, without causing any decomposition. The first two mentioned are liquids at ordinary temperatures; $PCl_5$ is a solid. All have boiling points (or in the case of $PCl_5$, a sublimation point) below the temperatures used in dehydrating, but this fact does not detract from their effectiveness. Very small amounts of the compounds suffice.

In the usual mode of carrying out the process of the present invention, the catalyst is dissolved in the oil, in amounts of about 0.05 to 1 per cent, and the oil is brought up to a temperature of 500° to 540° F., advantageously under sub-atmospheric pressure. At this temperature water vapor is evolved, showing that dehydration is taking place. In general the reaction is complete within a few minutes after this temperature is reached. The acetyl test of the oil drops from 125 or thereabouts to as low as 3, a remarkably low value which corresponds to substantially complete dehydration.

If it is desired to polymerize the oil, as well as to dehydrate it, in order to develop maximum drying properties and water resistance, the oil containing the phosphorus-chlorine compound may be heated directly to polymerizing temperatures (such as 560 to 580° F.); that is, without pausing in the dehydrating range; and held there until the required consistency is obtained. The dehydration takes place as an incident to heating up to the polymerizing temperature.

It is unnecessary to remove any residual traces of catalyst from the final product.

*Example 1.*—As an example of one good specific embodiment of the present invention, 0.0625 per cent of phosphorus oxychloride was dissolved in a quantity of raw C. P. castor oil of acetyl value 125, iodine value 85 and acid value 2 to 3. The oil was rapidly heated up to 565° F. and then allowed to cool. The oil showed good miscibility with mineral oils.

*Example 2.*—As another example, an operation was carried out as in Example 1, but heating was continued at the same temperature for five hours until the viscosity reached Z—2 on the Gardner scale. The product showed on test: acetyl value 3.2, acid value 6.3 and iodine value 112.6. It was very light in color, and had excellent drying properties, forming hard, waterproof films, as would be expected from its remarkably low acetyl value. The time for drying to a hard film was several hours, but nevertheless the oil produced was definitely a drying oil having excellent properties. This in itself is remarkable, since it has been established that when using phosphoric acid as a catalyst for dehydration, the product obtained does not have useful drying properties.

In the process of Example 2, the bodying time is reduced substantially (e. g., to 2 or 3 hours) by increasing the quantity of phosphorus oxychloride employed. Amounts up to 1 per cent or more can be employed, but it is seldom necessary or advantageous to employ more than 0.2 per cent, on the oil. Also, smaller amounts of catalyst, such as 0.05 per cent or less, give useful results, especially in the production of miscible oils without substantial drying properties, which do not require bodying.

Instead of phosphorus oxychloride, other soluble and non-acid compounds of chlorine and phosphorus may be employed. Phosphorus pentachloride, for example, may be used in the manner described, with substantially the same results. However, I generally find it more convenient, and therefore preferable, to work with the oxychloride in commercial operations.

By the terms "dehydration" and "dehydrating" as used in the specification and claims is meant the removal from the castor oil of water formed during the heating, as a result of chemical change in the oil. Presumably as pointed out above, this chemical change involves the separation of one or more hydroxyl groups together with one or more hydrogen atoms from the ricinoleic molecule.

What I claim is:

1. A method of dehydrating castor oil which comprises dissolving in the oil a small proportion of a catalyst comprising a neutral phosphorus chloride and heating the mixture at such temperature and for such time as to effect a substantial degree of dehydration of the oil and at least until the product has attained miscibility with mineral oil.

2. The method of claim 1, wherein said catalyst is added in a proportion of 0.05 to 1 per cent by weight, on the oil.

3. The method of claim 1, wherein said catalyst is phosphorus oxychloride.

4. The method of claim 1, wherein the heating is arrested at a stage such that the oil shows miscibility with petroleum hydrocarbons but no substantial drying properties.

5. The method of claim 1, wherein the heating is continued until the oil exhibits substantial drying properties.

6. The method of claim 1, wherein the heating is carried out under sub-atmospheric pressure.

7. A method of modifying castor oil which comprises dissolving in the oil a small proportion of a neutral castor-oil-soluble compound containing phosphorus and chlorine, selected from the class consisting of phosphorus oxychloride, phosphorus trichloride and phosphorus pentachloride, and heating the mixture to an elevated temperature above approximately 500° F., at least until the product has attained miscibility with mineral oil.

8. The method of catalytically modifying castor oil for effecting dehydration thereof which comprises heating a mixture of castor oil and a small proportion of a neutral phosphorus chloride to an elevated temperature within the range where water is formed as the result of chemical change in the castor oil molecule, at least until the product has attained miscibility with mineral oil.

9. The method of catalytically modifying castor oil which comprises heating a mixture of castor oil and a small proportion of a neutral phosphorus chloride to an elevated temperature within the range where dehydroxylation occurs, at least until the product has attained miscibility with mineral oil.

10. The method of catalytically modifying castor oil which comprises holding a mixture of castor oil and a small proportion of a neutral phosphorus chloride at an elevated temperature within the range where dehydroxylation occurs, until the oil exhibits substantial drying properties.

ALEXANDER SCHWARCMAN.

CERTIFICATE OF CORRECTION.

Patent No. 2,330,180.  September 21, 1943.

ALEXANDER SCHWARCMAN.

It is hereby certified that error appears in the printed specification of the above numbered patent requiring correction as follows: Page 1, first column, line 26, for "firms" read --films--; and that the said Letters Patent should be read with this correction therein that the same may conform to the record of the case in the Patent Office.

Signed and sealed this 9th day of November, A. D. 1943.

(Seal)

Henry Van Arsdale,
Acting Commissioner of Patents.